US007904809B2

(12) United States Patent
Corning et al.

(10) Patent No.: US 7,904,809 B2
(45) Date of Patent: Mar. 8, 2011

(54) MODEL-BASED EDITORS FOR DYNAMIC VALIDATION

(75) Inventors: Michael P Corning, Woodinville, WA (US); Christopher J Lovett, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 11/771,905

(22) Filed: Jun. 29, 2007

(65) Prior Publication Data
US 2009/0006947 A1 Jan. 1, 2009

(51) Int. Cl.
*G06F 17/00* (2006.01)
(52) U.S. Cl. ............... 715/259; 715/255; 715/273
(58) Field of Classification Search .......... 715/200, 715/255, 256, 259, 257, 267, 273
See application file for complete search history.

(56) References Cited

U.S. PATENT DOCUMENTS

| 6,604,099 | B1 | 8/2003 | Chung et al. | |
|---|---|---|---|---|
| 6,910,040 | B2 * | 6/2005 | Emmick et al. | 1/1 |
| 6,950,985 | B2 * | 9/2005 | Lee | 715/234 |
| 6,988,025 | B2 * | 1/2006 | Ransom et al. | 700/295 |
| 7,039,859 | B1 | 5/2006 | Sundaresan | |
| 7,058,558 | B2 | 6/2006 | Reichenthal | |
| 7,096,224 | B2 * | 8/2006 | Murthy et al. | 707/763 |
| 7,155,670 | B2 | 12/2006 | Takizawa et al. | |
| 7,225,425 | B2 * | 5/2007 | Kompalli et al. | 717/108 |
| 2002/0147745 | A1 * | 10/2002 | Houben et al. | 707/513 |
| 2002/0184188 | A1 * | 12/2002 | Mandyam et al. | 707/1 |
| 2003/0046317 | A1 * | 3/2003 | Cseri et al. | 707/513 |
| 2003/0069887 | A1 * | 4/2003 | Lucovsky et al. | 707/10 |
| 2004/0177321 | A1 | 9/2004 | Brown et al. | |
| 2005/0102612 | A1 | 5/2005 | Allan et al. | |
| 2005/0273707 | A1 | 12/2005 | Chu et al. | |
| 2006/0101038 | A1 * | 5/2006 | Gabriel et al. | 707/100 |
| 2006/0143562 | A1 | 6/2006 | Seurig et al. | |
| 2006/0150085 | A1 | 7/2006 | Davis et al. | |

OTHER PUBLICATIONS

Chidlovskii, "A Structural Adviser for the XML Document Authoring", available at least as early as Apr. 4, 2007, at <<http://www.xrce.xerox.com/Publications/Attachments/2003-070/p346-chidlovskii.pdf>>, ACM, 2003, pp. 1-9.

Ciancarini, et al, "Managing Complex Documents over the WWW: A Case Study for XML", available at least as early as Apr. 4, 2007, at <<http://www.cs.unibo.it/pub/TR/UBLCS/1999/99-06.ps.gz>>, pp. 1-16.

Quint, et al., "Techniques for Authoring Complex XML Documents", available at least as early as Apr. 4, 2007, at <<http://wam.inrialpes.fr/publications/2004/DocEng2004VQIV.pdf>>, ACM, 2004, pp. 1-9.

* cited by examiner

*Primary Examiner* — Stephen S Hong
*Assistant Examiner* — Gregory J Vaughn
(74) *Attorney, Agent, or Firm* — Lee & Hayes, PLLC

(57) ABSTRACT

Tools and techniques for dynamically validating editors are described herein. The tools may provide machine-readable storage media containing machine-readable instructions for receiving indications of user edits to a portion of a document, and for determining whether a customized editor is available for the edited portion of the document. The tools may also provide systems that include at least the dynamically validating editor.

20 Claims, 3 Drawing Sheets

MODEL-BASED EDITORS FOR DYNAMIC VALIDATION

BACKGROUND

XML documents are increasingly being used to perform a variety of different operations in a number of different contexts. For example, enterprise management systems may provide management packs or other maintenance documents in XML form. In addition, human authors may create XML documents that contain test cases for some software or system under test.

As XML documents continue to proliferate, these documents may represent abstract information having increased richness and complexity. These documents may express multiple relationships between elements within the same document, as well as between elements within two or more different documents. Many of these constraints are not expressible using standard XML validation techniques. Edits and revisions to such documents may consume considerable time. Typically, these documents are submitted to a post-edit validation process after editing is completed. However, if this validation process identifies any errors, the time spent editing the document may be effectively wasted. This issue may become especially acute as the complexity of the document contents increases.

SUMMARY

Tools and techniques for dynamically validating editors are described herein. The tools may provide machine-readable storage media containing machine-readable instructions for receiving indications of user edits to a portion of a document, and for determining whether a customized editor is available for the edited portion of the document. The tools may also provide systems that include at least the dynamically validating editor.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to dynamically validating editors are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for dynamically validating editors. This discussion also describes other techniques and/or processes that the tools may perform.

Figure 1:
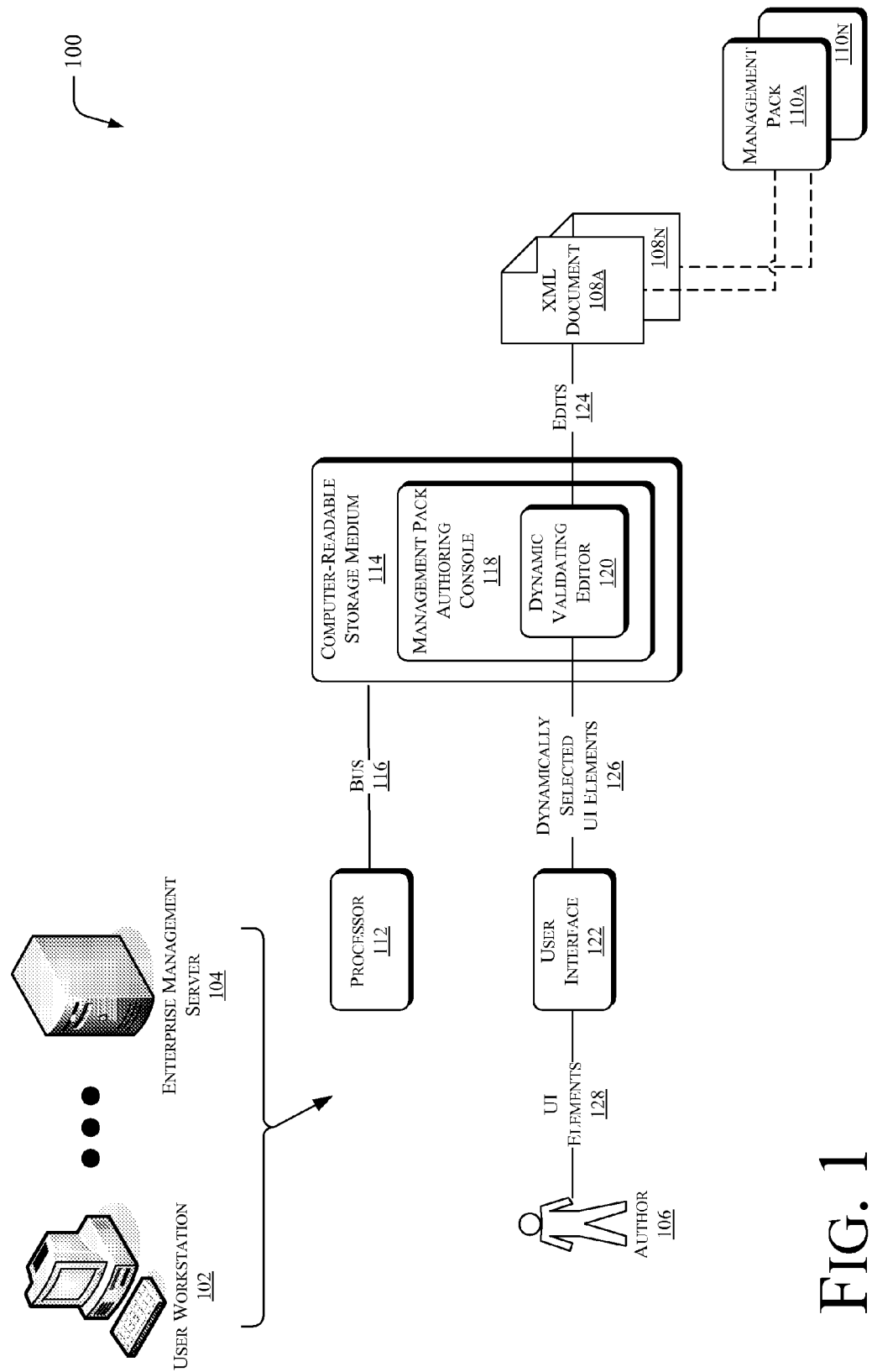
FIG. 1 is a block diagram illustrating systems and/or operating environments in which dynamically validating editors may perform.

FIG. 1 illustrates systems and/or operating environments 100 in which dynamically validating editors may perform. The systems 100 may include one or more user workstations 102 and/or servers 104. The systems 100 may provide the workstations 102 and/or servers 104 as part of an enterprise management system, with one possible example of such being the Systems Center Operations Manager family of service management solutions, available from Microsoft Corporation of Redmond, Wash. However, it is noted that this description provides this example only to facilitate discussion of the subject matter herein, but not to limit possible implementations of this subject matter.

The systems 100 may enable one or more authors 106 to create, revise, or otherwise edit documents in, for example, the Extensible Markup Language (XML). FIG. 1 provides examples of such XML documents at 108a and 108n (collectively, documents 108), but implementations of the description herein may include any number of such documents. In an example described herein, these documents 108 may take the form of management packs (MPs). FIG. 1 provides examples of MPs at 110a and 110n (collectively, MPs 110), but implementations of the systems 100 may include any number of MPs. The authors 106 may draft and generate to support deployments of the enterprise management system. MPs may, for example, provide bug fixes, extended functionality, additional features, or the like.

Turning to the workstations and servers, the workstation may communicate remotely with the server, or the workstations may be standalone systems. Workstations and/or servers may be computer-based systems that include one or more processors, denoted at 112. These processors may also be categorized or characterized as having a given type or architecture, but may or may not have the same type or architecture.

The workstations and/or servers may also include one or more instances of machine-readable or computer-readable storage media, denoted generally at 114. The processor 112 may communicate with the computer-readable media 114, and other components or sub-systems of the workstations and/or servers, via one or more busses 116. These busses 116 may be of any suitable width, and may comply with any convenient bus architecture.

The computer-readable media 114 may contain instructions that, when executed by the processor 112, perform any of the tools or related functions that are described herein as being performed by the workstations and/or servers. The processor may access and/or execute the instructions embedded or encoded onto the computer-readable media, and/or may access data stored in the computer-readable media. Additionally, it is noted that the computer-readable storage media, and any software stored thereon, may reside on hardware other than that shown in FIG. 1 without departing from the scope and spirit of the description herein. The examples shown in FIG. 1 are provided only to facilitate discussion, but not to limit possible implementations.

Turning in more detail to the computer-readable media 114, it may include one or more instances of a management pack authoring console application 118. The management pack authoring console 116 in turn may include at least a dynamic validating editor 120, which represents a collection of software instructions that, when loaded into the processor and executed, may enable the workstation and/or server to perform any of the tools described herein.

In overview, the dynamic validating editor may enable the author to create or edit one or more XML documents (e.g., 108). The workstations and/or servers may provide a suitable user interface 122, though which the author may interact with the workstations and/or servers in working with the XML documents. More specifically, based at least on where in the XML document the author is working and what type of data the author is working with, the validating editor may dynamically select UI elements to present to the author. Thus, the validating editor may vary the UI elements presented to the author, depending on the context within which the author is working in one or more of the XML documents. FIG. 1 denotes at 124 the edits to the XML file as entered by the author, and denotes the UI elements as dynamically selected by the editor at 126. Finally, FIG. 1 denotes at 128 the dynamically selected UI elements as presented to the author.

Figure 2:
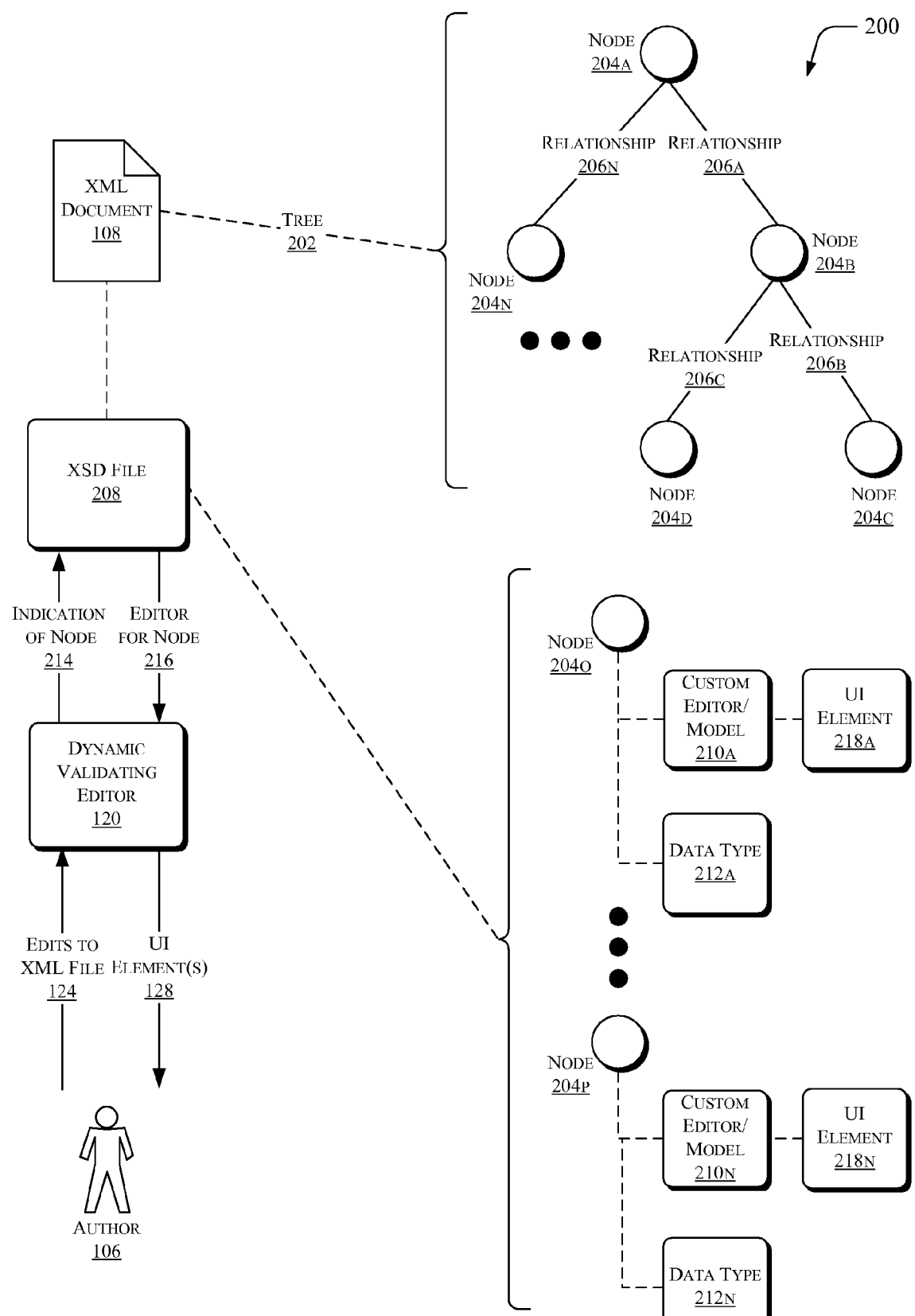
FIG. 2 is a block diagram illustrating elements of XML files shown in FIG. 1, and illustrates relationships therebetween.

Having described the systems and/or operating environments 100 in which dynamically validating editors may perform in FIG. 1, the discussion now turns to a more detailed description of elements of the XML files 108, and relationships therebetween, now presented with FIG. 2.

FIG. 2 illustrates elements of the XML files shown in FIG. 1, and illustrates relationships therebetween, as denoted generally at 200. For convenience of description, but not to limit possible implementations, FIG. 2 may carry forward some items described previously, and may denote them by similar reference signs.

As shown in FIG. 2, the document 108 may include an arbitrary number of XML elements, and these elements may be organized or visualized as having a tree-like structure or other hierarchical representation or organization, as indicated by the dashed line 202. The tree structure may include respective nodes corresponding to the elements defined in the XML, with FIG. 2 providing examples of nodes at 204*a*, 204*b*, 204*c*, 204*d*, and 204*n* (collectively, nodes 204).

The tree 202 represents a model of the dynamic relations between the XML nodes 204. FIG. 2 denotes these relations between the nodes at 206*a*, 206*b*, 206*c*, and 206*n* (collectively, relations 206). While FIG. 2 illustrates relationships between nodes within a given document 108, relationships may also exist between nodes in two or more different documents. Thus, for example, two or more of the nodes 206 may exist in different documents 108.

The XML document 108 may be associated with an XML Schema Definition (XSD) file, denoted at 208. The XSD file may be used to statically validate the XML instance document as the author edits the document. Without limiting possible implementations, static validation may refer XSD validation that has no control flow mechanism and no built in event handling mechanism. This, in turn, means that an instance node value may not depend logically on the value of other instance nodes. Also, this means that when a given node changes, nodes dependent on the changed node have no way to change which parts of the XSD schema now apply to the dependent node's value validation.

The XSD file as described herein may extend the static validation capability of XSD by adding general purpose XSD <xs:appinfo> nodes under the <xs:annotation> node. These appinfo nodes describe location of the code extensions to use to edit those elements and and/or use to perform dynamic validation of those edits. This code can be called from the editor itself, or from a totally separate dynamically-linked library (dll).

The model described herein may assign custom editors to the XSD file, and may associate these editors with respective nodes in the XML document. FIG. 2 provides examples of custom editors at 210*a* and 210*n* (collectively, custom editors 210), with these custom editors being associated respectively with representative nodes 204*o* and 204*p*.

As detailed further below, these custom editors 210 have detailed knowledge of the intra-node dynamics of the XML document. Put differently, the XSD file describes the structural relationships between XML nodes, as well as providing data types for the nodes. FIG. 2 provides examples of data types at 212*a* and 212*n* (collectively, data types 212), associated respectively with the nodes 204*o* and 204*p*.

Using a suitable attribute (e.g., the vs:editor attribute), the XSD file can notify the model-based editor (e.g., 120) of the strongly-typed editor for a given node being edited by the author. For example, FIG. 2 carries forward the edits to the XML file at 124, and the editors 120 may query the XSD file with a current node being edited, as indicated at 214. The XSD file may return an appropriate custom editor that is dynamically selected for the node of interest, as denoted at 216. In turn, the validating editor 120 may present one or more UI elements related to the custom editor, as carried forward at 128. The XSD file may associate these UI elements with respective custom editors 210, as indicated at 218*a* and 218*n*, with the UI elements 128 being retrieved from the XSD file.

More particularly, the editor 120 may consumes the value of the attribute (e.g., vs:editor), and may decide at design time precisely which UI element (e.g., 128) to expose to the author. This choice can be based on the current state of the XML document. In other words, the model-based editor 120 can treat an XML file like a state machine, branching control of the editing surface based on the current state of the "machine." In this analogy, the nodes of the XML document correspond to the states of this machine.

As an example of the foregoing, assume that the author is editing a node of the XML file to define some "string" value. In this example, the editor 120 may sense whether the string value of the node can be an arbitrary string typed in a text box, or whether the string value is to be taken from a dropdown list of predefined, available strings, with this list being populated with the names of classes pulled from a .dll file or pulled from another file (e.g., a Management Pack).

The following example shows how the tools described herein may take a declaration of a cls attribute defined in a varmap schema, and decide whether to provide a custom dropdown control to edit the cls attribute's instance value, or to leave the field as a text box to be filled with arbitrary text. The choice between these options may depend on the current state of the XML document. For example, this choice may depend on the values of the assembly attribute and the current variable's mode attribute. The model of the interplay of these three fields is described below.

---

<varmap owner="mcorning" dsc="This spec tests
Socrates 4." assembly="unit2005.dll"
xmlns="http://smxinfranet/schemas/mcf/2007/01/varmap
">
   <var set="1" lvl="0" vid="1" cid="_893e625b-cf70-
4ccf-baa9-5f03f07756ec" cls="" dsc="Add sub grp
node" focus="positive" cat="general" mode="manual"

-continued

```
feature="Socrates4/AddNode/var">
    ...</var>
        <var set="2" lvl="0" vid="1" cid="_835ac573-7150-
        4d3d-ae70-1822a4ca86a6"
        cls="UnitTest.MyVarSimpleRandomString" dsc="describe
        test" focus="positive" cat="general" mode="auto"
        feature="TBD">
    ...</var>
</varmap>
```

As the discussion proceeds below, the description includes various samples of code segments as an aid to understanding the concepts provided as part of the tools. However, it is noted that these segments of code are illustrative in nature, and do not limit possible implementations of the description herein. For example, the names of various variables, classes, methods, and functions are provided only for ease of reference, and implementations of the description may use different names without departing from the scope and spirit of the description herein. Additionally, it is noted that various alterations or modifications of these code segments are possible, also without departing from the scope and spirit of the description herein.

Continuing this example, a sample XSD declaration is now provided, calling attention to the type attribute and vs:editor values. In this example, both values are used to establish context for the editor.

```
<xs:attribute name="cls" type="reflectedClassType" use="required"
vs:editor="Socrates.ReflectionEditor">
```

Here are example varmap.xsd declarations for the two user-defined types used by a ReflectionEditor:

```
<xs:simpleType name="reflectedClassType">
    <xs:list itemType ="xs:string"></xs:list>
</xs:simpleType>
<xs:simpleType name="reflectedMethodType">
    <xs:restriction base="xs:string">
        <xs:pattern value=" ([\(\)\w\.+-]|\s|_)+$">
        </xs:pattern>
    </xs:restriction>
</xs:simpleType>
```

Figure 3:
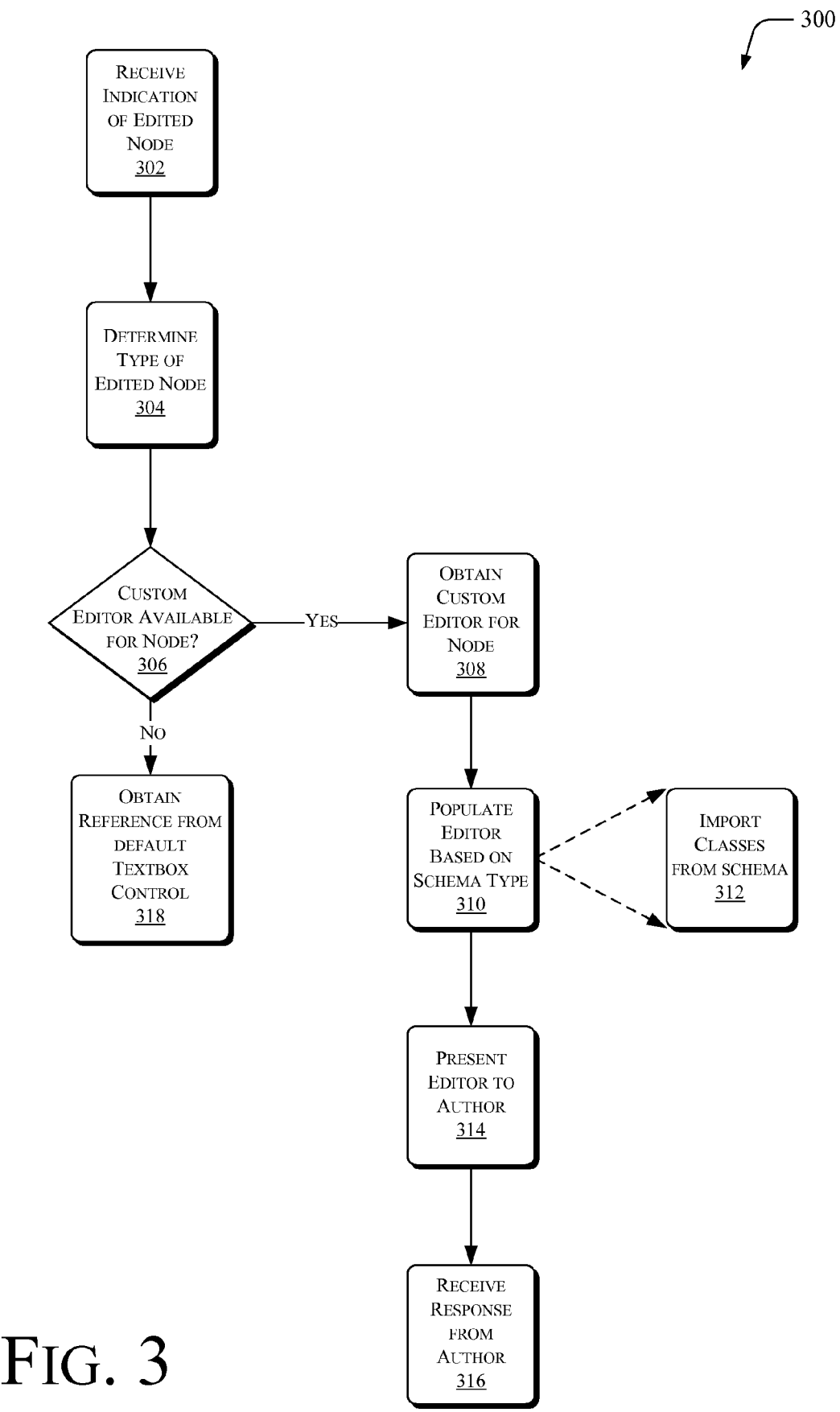
FIG. 3 is a flow diagram of processes for generating the dynamically validating editors.

Referring to FIG. 3, a flow diagram of processes 300 for generating the dynamically validating editors, these processes may result in exposing a custom editor based on a current context within an input document. Block 302 represents receiving an indication of a current node being edited by a user (e.g., the author 106), and block 304 represents determining a type of the current edited node.

Referring to the example, but non-limiting code listing below, the edit process may begin with a reference to the editor 120, which sets the SchemaType of the edited node and returns an instance of a custom editor, if possible, as represented at decision block 306. If a custom editor is available, as indicated by the "Yes" branch from block 306, the editor may obtain a custom editor for the node, as indicated at block 308. After obtaining an instance of the custom editor, BeginEdit( ) populates that editor based on the XSD type from the schema, as indicated at block 310. That is, the editor 120 may set its SchemaType property to the simpleType named "reflectedClassType". The editor 120 may determine that the ListBox control may obtain items taken from the list of classes in the varmap's test assembly, as shown in the SchemaType property listing and as represented at block 312.

Block 314 represents presenting the custom editor to the user, and block 316 represents receiving a response from the user to the custom editor. Continuing the example above, if the user is editing a given node to have a "string" value, a schema governing the XML file may permit filling the string with different types of values. For example, the schema may specify that the string is to be filled with an arbitrary string. Alternatively, the schema may stipulate that the string value be populated from a set of predefined choices specified by an enum in the schema. Thus, the editor as presented to the user may permit the user to enter an arbitrary string, or may permit the user only to select from one of the predefined alternatives from a dropdown list. In this manner, the customized editor may implement any restrictions specified by the schema that are applicable to the node currently being edited. In addition, the customized editor may implement restrictions that are not specified by the schema, or that are not expressible in schema. For example, the customized editor may show choices that are based on reflection of classes in a given assembly.

Additionally, the customized editor may validate any inputs or edits to the revised document when the user or author provides these inputs or edits. If some input is invalidated, the customized editor may explain to the user any validity, and may recommend corrective action, substantially in real time with the invalidated inputs. In this manner, the dynamically validating editor may enable the user to save time when editing the document, as compared to completing all edits, and then submitting the edited document in batch to a post-edit validation process.

As indicated in the code segment below, specifically the portion beginning with the line "if(this.editor!=null)...", the currentEditor performs the actual edits in a UI provided by the editor. Referring back to decision block 306, the currentEditor may obtain a reference from the instantiated custom editor, as indicated by the Yes branch from block 306 to block 308. However, if no custom editor exists for a given node, the currentEditor may obtain a reference from the default textbox control, as indicated by the No branch from block 306 to block 318.

```
public void BeginEdit(string text, IIntellisenseProvider provider,
        EditMode mode, Color color, bool focus) {
    ...
    switch (mode) {
        case EditMode.Value:
            builder = provider.Builder;
            this.cset.Builder = builder;
            this.editor = provider.Editor;
            if (this.editor != null) {
                this.editor.Site = this.site;
            }
            values = provider.GetExpectedValues( );
            break;
    ...
    }
    this.schemaType = provider.GetSchemaType( );
    if (this.editor != null) {
        this.currentEditor = this.editor.Editor;
        parent.Controls.Add(this.currentEditor);
        this.editor.SchemaType = this.schemaType;
        ...
        this.editor.XmlValue = text;
    } else {
        this.currentEditor = this.textEditor;
        this.currentEditor.Text = text;
    }
    ...
    // see if this node needs a dropdown.
    if (builder != null || (values != null && values.Length > 0)) {
        cset.BeginEdit(values, this.schemaType);
    }
}
```

The Editor constructor may query the schema for the vs:editor value, using that string to instantiate and return an instance of the (named) class that implements the IXmlEditor interface, if possible. Note this is a case where the editor 120 is context sensitive. Also, the comments below indicate the dynamic nature of editing the cls attribute.

```
/// <summary>
/// A constructed type of the name provided by the vs:editor attribute
/// in the instance doc's schema. The named class is implemented in
/// SocratesEditors.cs.
/// </summary>
public override IXmlEditor Editor {
   get {
     string typeName = base.GetIntellisenseAttribute("editor");
     /* check state machine model of document when typeName is
      * ReflectionEditor.
      * if varmap assembly is manual then do not instantiate a
      * ReflectionEditor because there will be no dll to dereference.
      * without a dll, the editor may not obtain a list of classes or
      * methds.
      * if the assembly attribute has value an instance of the
      * assembly is in memory, and the ReflectionEditor can obtain
      * a list of classes or methods.
      * so if the editor is based on Reflection and there is an
      * assembly in memory, proceed.
      */
     if (typeName == "Socrates.ReflectionEditor")
     {
        SocratesTreeNode parent =
              (SocratesTreeNode)ContextNode.Parent;
        if (parent.IsManualOnly)
        {
           return null;
        }
        else if (parent.IsManual)
        {
           return null;
        }
     }
     if (!string.IsNullOrEmpty(typeName)) {
        IXmlEditor editor = ConstructType(typeName) as IXmlEditor;
        if (editor != null) editor.Owner = this;
        return editor;
     }
     // see if there are any base custom editor for the schema type
     // of the selected node
     return base.Editor;
   }
}
```

The editor 120 may use .Net Reflection to invoke the named constructor to create a new instance of the named .NET class, in this example, the Socrates.ReflectionEditor constructor.

```
///
/// <param name="typeName">the fully qualified class reference for the
/// editor that will edit the current node.</param>
/// <returns>an instance of the custom editor</returns>
private object ConstructType(string typeName) {
    // Cache the objects so they can preserve user state.
    if (typeCache.ContainsKey(typeName))
        return typeCache[typeName];
    Type t = Type.GetType(typeName);
    if (t != null) {
        ConstructorInfo ci = t.GetConstructor(new Type[0]);
        if (ci != null) {
            object result = ci.Invoke(new Object[0]);
            if (result != null) {
                typeCache[typeName] = result;
                return result;
            }
        }
    }
    return null;
}
```

Since the Socrates.ReflectionEditor subclasses the SocratesEditor, the SocratesEditor implements the IXmlEditor interface by adding a GetDataSourceAppInfo method, to which the discussion returns below.

```
/// <summary>
/// Abstract class that implements default Socrates editor behavior.
/// Implements IXmlEditor.
/// The default editing control is ListBox.
/// </summary>
abstract class SocratesEditor : IXmlEditor, IDisposable
{
    protected ListBox editor = new ListBox( );
    protected XmlSchemaType type;
    protected ISite site;
    protected IIntellisenseProvider owner;
    public SocratesEditor( ) {
    }
    public virtual IIntellisenseProvider Owner {
         get { return this.owner; }
         set { this.owner = value; }
    }
    public virtual ISite Site {
         get { return this.site; }
         set { this.site = value; }
    }
    /// <summary>
    /// This property provides the XmlSchemaType for the editor
    /// </summary>
    public virtual XmlSchemaType SchemaType {
         get { return this.type; }
         set { this.type = value;}
    }
    public virtual Control Editor {
         get { return editor; }
    }
    public virtual string XmlValue {
         get {
             return editor.Text;// XmlConvert.ToString( );
         }
         set { this.editor.Text = value; }
    }
    protected string GetDataSourceAppInfo(XmlCache model) {
         string dataSource = null;
         XmlSchemaInfo info =
            model.GetTypeInfo(((XmlTreeNode)this.owner.-
            ContextNode).Node);
         foreach (XmlSchemaAppInfo a in info.SchemaAttribute.-
            Annotation.Items) {
             foreach (XmlElement e in a.Markup) {
                if (e.Name == "dataSource") {
                   dataSource = e.InnerText;
                   break;
                }
             }
         }
         return dataSource;
    }
    ~SocratesEditor( )
    {
         Dispose(false);
    }
    public void Dispose( ) {
         Dispose(true);
         GC.SuppressFinalize(this);
    }
    protected virtual void Dispose(bool disposing){
    }
}
```

The Socrates.ReflectionEditor overrides the SchemaType property and uses the information to dynamically calculate the list of items to populate the in the listbox which is returned as the editor 120.

```
class ReflectionEditor : SocratesEditor
{
    public ReflectionEditor( ) {
        //base.editor.DropDownStyle = ComboBoxStyle.Simple;
    }
    /// <summary>
    /// This property provides the XmlSchemaType for the editor
    /// </summary>
    public override XmlSchemaType SchemaType {
        get { return base.type; }
        set {
            base.type = value;
            if (base.type != null) {
                base.editor.Items.Clear( );
                TestAssembly testAssembly =
                        (TestAssembly)base.Site.GetService(typeof(TestAssembly));
                if (null == testAssembly) {
                    MessageBox.Show("Cannot dereference assembly.",
                                    "Reflection Error");
                    return ;
                }
                string clsName =null;
                if (this.owner.ContextNode.Label == "cls") {
                    clsName = this.owner.ContextNode.Text;
                } else {
                    XmlAttribute clsAtt =
((XmlTreeNode)this.owner.ContextNode.Parent.Parent).Node.Attributes["cls"] as XmlAttribute;
                    if (null == clsAtt) throw new ArgumentException(
                            "The selected node's parent does not have a
                            cls attribute.");
                    clsName = clsAtt.Value;
                }
                testAssembly.MetaData =
                        testAssembly.GetTestAssemblyMetaData(clsName,
                        this.owner.ContextNode.Parent.Label);
                if (null == testAssembly.MetaData) {
                    MessageBox.Show(
                            "Cannot find any metadta for assembly.",
                            "Reflection Error");
                    return ;
                }
                switch (base.type.Name) {
                    case "reflectedClassType":
                        // get classes from test assembly
                        foreach (KeyValuePair<string, List<string>> kvp in
                                        testAssembly.MetaData) {
                            base.editor.Items.Add(kvp.Key);
                        }
                        break;
                    case "reflectedMethodType":
                        // get methods from test assembly for fnc tag's
                        // parent var node's cls attribute
                        foreach (KeyValuePair<string, List<string>> kvp in
                                        testAssembly.MetaData) {
                            if (kvp.Key == clsName) {
                                foreach (string method in kvp.Value) {
                                    base.editor.Items.Add(method);
                                }
                            }
                        }
                        break;
                }
            }
        }
    }
    ~ReflectionEditor( )
    {
        Dispose(false);
    }
}
```

In this example, if the SchemaType is reflectedMethodType, the editor 120 may iterate methods only for the specified class name.

Sometimes the value of an element or attribute is context sensitive, where context is ordinal. The set, lvl, and vid attributes in the varmap var element are an example of this. If a var is inserted, moved, copied or deleted, then attribute values of the new var or vars before and after the modified/new var may be updated. The model-based editor 120 constructed as described herein senses that the new attribute values are to be updated. In this case, a specific dynamically validating editor may not into play, but instead a dynamically valid edit. The model-based editing infrastructure described herein may handle automatic and/or discretionary edits.

In the next example, the description discusses how a new var gets its default values for its set, lvl, vid, and cid attributes.

Referring to the code segment below, an OnNodeInserted event handler is called after a node edit is complete. New elements are created using the CodeSnippet class that uses the Schema Object Model to generate any suitable attributes and elements from the instance document's XSD file (e.g., 208). In these cases, the editor 120 may have already created a new var node, but that new node may have no attributes. The OnNodeInserted( ) event generates suitable attributes for vars (there are no required elements for vars), adds the attributes to the new node, then sets the attribute node of the current var to its (context-sensitive) default value.

```
public override void OnNodeInserted(XmlTreeNode node)
{
    if (node.NodeType == XmlNodeType.Element)
    {
        sip = (SocratesIntellisenseProvider)GetService(
                        typeof(IIntellisenseProvider));
        CodeSnippet snip = sip.GetCodeSnippet( );
        XmlNode snippetNode = (XmlNode)snip.Snippet.Code.Data;
        int id = 0;
        XmlNode newNode = null;
        if ((snippetNode.Attributes.Count > 0) ||
            (snippetNode.HasChildNodes &&
            snippetNode.FirstChild.NodeType==XmlNodeType.Element))
        {
            // this code does not leave the original node behind (because we
            // don't try to delete it)
            // add the attributes in reverse order (so set, lvl, vid, and cid are
            // first)
            XmlTreeView xtv = (XmlTreeView)GetService(typeof(XmlTreeView));
            for (int i = snippetNode.Attributes.Count – 1; i > –1; i--)
            {
                XmlAttribute xa = snippetNode.Attributes[i];
                XmlAttribute a = Model.Document.CreateAttribute(xa.Name);
                a.Value = xa.Value;
                node.Node.Attributes.Append(a);
                SetDefaultValue(
                        new SocratesTreeNode(this, (XmlTreeNode)node, a));
            }
            foreach (XmlNode xn in snippetNode.ChildNodes)
            {
                if (xn.NodeType == XmlNodeType.Element)
                {
                    newNode = this.Model.Document.ImportNode(xn, true);
                    id = newNode.GetHashCode( );
                    node.Node.AppendChild(newNode);
                }
            }
            this.TreeView.BeginUpdate( );
            XmlTreeNodeCollection nodes = new XmlTreeNodeCollection(this,
                Model.Document);
            TreeView.Nodes = NodeTextView.Nodes = nodes;
            TreeView.EndUpdate( );
            XmlTreeNode tn = FindNode(node.Node);
            TreeView.SelectedNode = NodeTextView.SelectedNode = tn;
            tn.Expand( );
            ScrollIntoView(tn);
        }
        else
        {
            base.OnNodeInserted(node);
        }
    }
    else
    {
        base.OnNodeInserted(node);
    }
}
```

SetDefaultValue( ) first sets the IntellisenseProvider's contextNode to the new node, and this triggers a validation of the new context. First, a validation utility (e.g., the Socrates editor described herein) validates the element using the schema.

```
public virtual void OnContextChanged( ) {
    this.checker = null;
    // Get intellisense for elements and attributes
    if (this.node.NodeType == XmlNodeType.Element ||
```

```
            this.node.NodeType == XmlNodeType.Attribute ||
            this.node.NodeType == XmlNodeType.Text ||
            this.node.NodeType == XmlNodeType.CDATA) {
        XmlTreeNode elementNode = GetClosestElement(this.node);
        if (elementNode != null && elementNode.NodeType == XmlNodeType.Element) {
            this.xn = elementNode.Node;
            if (xn is XmlElement) {
                this.checker = new Checker((XmlElement)xn,
                    elementNode == this.node.Parent ?
                        IntellisensePosition.FirstChild :
                        (this.node.Node == null ? IntellisensePosition.AfterNode :
                        IntellisensePosition.OnNode)
                );
                this.checker.Validate(model);
            }
        }
    }
}
```

Next, the editor 120 may override OnContextChange and perform custom validation using its model of a SocratesTreeNode.

```
/// <summary>
/// Called before an edit starts. ContextNode's validity is context-sensitive,
/// this method dynamically validates initial value and value(s) of
/// related nodes.
/// </summary>
public override void OnContextChanged( )
{
    base.OnContextChanged( );
    // before we edit, ensure preconditions by using model to
    /// check for dynamic validation exceptions
    SocratesTreeNode stn = (SocratesTreeNode)base.ContextNode.Parent;
    switch (ContextNode.Label)
    {
        case "name":
            //must have cls if AssemblyAvailable
            if (stn.IsAutomated)
            {
                if (stn.AssemblyAvailable)
                {
                    if (stn.IsAutomated && string.IsNullOrEmpty(stn.Cls))
                    {
                        MessageBox.Show("Var is automated but cls attribute "+
                            "is missing and assembly is available. \n\n"+
                            "Change mode to manual or assign class from "+
                            "assembly to cls attribute.",
                            "Validation Exception");
                    }
                }
                else
                {
                    MessageBox.Show("Var is automated but assembly is "+
                        "unavailable. \n\nChange mode to manual or assign a dll "+
                        "to the varmap's assembly attribute then assign a class "+
                        "from assembly to cls attribute.",
                        "Validation Exception");
                }
            }
            break;
        case "cls":
            if (null!=stn.Mode && stn.IsManualOnly)
            {
                if (stn.IsAutomated)
                {
                    MessageBox.Show("This varmap contains only manual tests, "+
                        "but this var is automated. "\n\n "+
                        "To edit cls, first assign a dll to the varmap's "+
                        "assembly attribute. \n "+
                        "And to avoid confusion, if you do not change "+
                        "assembly, change mode to manual.",
                        "Validation Exception");
                }
                else
```

```
        {
            MessageBox.Show("This varmap contains only manual tests."+
                " \n\nTo edit cls, first assign a dll to the varmap's "+
                "assembly attribute.", "Validation Exception");
        }
    }
    break;
  }
}
```

After validating the new node, the editor obtains the new attribute's default value. If the XSD file generates the XML for the new node, it may be redundant to validate this XML again. Since attributes like set, lvl, and vid depend on the value of those attributes in the var preceding the current one, GetDefaultValue( ) obtains a reference to the var's previous sibling, referred to herein as the new var's "uncle" node. The current set attribute is in the current var node's context. The set's uncle var node is the sibling of the set's parent, ergo, uncle.

The default value for set is the uncle var's set attribute value. The default value of lvl is "0", unless the uncle node is a var, in which case that lvl is reused as a default. The vid is an ordinal value, so 1 is added to the uncle's vid, assuming uncle is a var with the same set and lvl.

Regarding the other var attributes, their default values are obtained from enums (if the attribute is based on an enum type in the schema) or from the base class.

```
public override string GetDefaultValue( ) {
    string x = "1";
    XmlSchemaType schemaType= base.GetSchemaType( );
    if (null == schemaType) {
        return null;
    }
        else
        {
            SocratesTreeNode parent =
                    (SocratesTreeNode)ContextNode.Parent;
            SocratesTreeNode uncle =
                    (SocratesTreeNode)parent.PrevNode;
            switch (schemaType.Name)
            {
              case "setType":
                    if (uncle.Label == "var")
                    {
                        x = uncle.Set;
                    }
                    return x;
                case "cidType":
                    return "_" +
                            XmlConvert.ToString(System.Guid.NewGuid( ));
                case "lvlType":
                    // default lvl is 0
                    x = "0";
                    if (uncle.Label == "var")
                    {
                        x = uncle.Lvl;
                    }
                    return x;
                case "vidType":
                    int y = 1;
                    if (uncle.Label == "var")
                    {
                        if (parent.Set==uncle.Set &&
                                parent.Lvl == uncle.Lvl)
                        {
                            y = int.Parse(uncle.Vid) + 1;
                        }
                    }
                    return XmlConvert.ToString(y);
                default:
                    if (schemaType is XmlSchemaSimpleType)
                    {
                        XmlSchemaSimpleType st =
                                (XmlSchemaSimpleType)schemaType;
                        if (st.Content is XmlSchemaSimpleTypeRestriction)
                        {
                            XmlSchemaSimpleTypeRestriction cr =
                                    (XmlSchemaSimpleTypeRestriction)st.Content;
                            foreach (XmlSchemaFacet f in cr.Facets)
```

```
            {
                if (f is XmlSchemaEnumerationFacet)
                {
                    XmlSchemaEnumerationFacet ef =
                            (XmlSchemaEnumerationFacet)f;
                    return ef.Value;
                }
            }
        }
        return base.GetDefaultValue( );
    }
}
```

Two other types of editors are the IDRefEditor and the AutoGenEditor. The AutoGenEditor may operate as follows: when editing an extant attribute whose vs:editor is set to Socrates.AutoGenEditor, the AutoGenEditor may calls the same GetDefaultValue( ) method that is used for new attributes.

```
<xs:attribute name="lvl" type="lvlType" use="required"
                vs:editor="Socrates.AutoGenEditor">
    <xs:annotation>
        <xs:appinfo>
            <autogen />
            <tooltip>viz., BVT, Regression, Functional, Stress</tooltip>
        </xs:appinfo>
```

```
    </xs:annotation>
</xs:attribute>
```

The IDRefEditor may operate by calling the method with which the editor 120 extended the IXmlEditor interface. The editor 120 may support model-based testing. When editing a preref (or postref) attribute of the fnc childnode of the var element, the IDRefEditor can gather data from a states element to ensure only valid pre and post conditions are assigned to an fnc element. If the varmap does not contain any state's elements, the IDRefEditor has nothing to display, and so the editor 120 may so warn the author and advises ways to resolve the issue.

```
<xs:attribute name="preref" type="xs:IDREF" use="optional"
                vs:editor="Socrates.IDRefEditor">
    <xs:annotation>
        <xs:appinfo>
            <dataSource>states</dataSource>
            <tooltip>states elements provide IDREF values</tooltip>
        </xs:appinfo>
    </xs:annotation>
</xs:attribute>
class IDRefEditor : SocratesEditor {
    public override XmlSchemaType SchemaType {
        get {
            return base.SchemaType;
        }
        set {
            base.SchemaType = value;
            string dataSource =
((SocratesIntellisenseProvider)Owner).GetAppInfoValue("dataSource");
            XmlNodeList ids =
((SocratesIntellisenseProvider)Owner).GetNodes(dataSource);
            editor.Items.Clear( );
            if (ids.Count == 0)
            {
                MessageBox.Show("The preref and postref attributes take their "+
                        "value from the collection of states elements in the varmap.\n\n"+
                        "Add states elements under the varmap node to get dropdown "+
                        "lists for this attribute.",
                        "Validation Exception");
                return;
            }
            foreach (XmlNode id in ids) {
                // TODO: use a more explicit dereference to the
                // attribute of type ID (schemaInfo property?).
                base.editor.Items.Add(id.Attributes["id"].Value );
            }
        }
    }
}
```

Model-based editing as described implement "models" of the interrelationship between elements programmatically. However, further augmentations to the XSD file may enable it to store the models that would otherwise be expressed in code. Further, by referring to the XSD file, the editor 120 may divine these models from the schema at runtime. These augmentations may keep the models close to the XSD, and may make the models portable, such that the models are used only when the correct XSD namespace is in scope.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. At least one machine-readable storage medium comprising machine-readable instructions that, when executed by the machine, cause the machine to perform a method comprising:
    receiving at least one indication of at least one user edit to a portion of a document;
    representing the portion of the document as a node within a hierarchical representation of the document;
    determining a type of the node;
    determining whether a customized editor is available for the portion of the document; and
    when the customized editor is available, populating at least part of the customized editor dynamically based, at least in part, on (i) the type of the node, (ii) imported classes from a schema, and (iii) at least one restriction that is specified by an enum in the schema and that is applicable to the node.

2. The machine-readable storage medium of claim 1, wherein the schema is specified in an XSD file.

3. The machine-readable storage medium of claim 1, further comprising instructions for validating the user edit based at least in part on the portion of the document and the type of the node.

4. The machine-readable storage medium of claim 1, further comprising instructions for obtaining the customized editor based on a location of the node within the hierarchical representation of the document.

5. The machine-readable storage medium of claim 4, wherein the hierarchical representation of the document provides a model-based representation of a relationship between the node and at least one further node.

6. The machine-readable storage medium of claim 1, further comprising instructions for presenting the customized editor to the user, and for receiving a response from the user via the customized editor.

7. A workstation including the machine-readable storage medium of claim 1.

8. An enterprise management server including the machine-readable storage medium of claim 1.

9. The machine-readable storage medium of claim 1, wherein the document is a management pack.

10. The machine-readable storage medium of claim 1, wherein the document is an XML document.

11. The machine-readable storage medium of claim 1, wherein when the user edit is invalidated, the customized editor explains validity, and recommends corrective action.

12. The machine-readable storage medium of claim 1, wherein the instructions for populating the customized editor further include instructions for implementing restrictions that are not specified by the schema or that are not expressible in the schema.

13. A system comprising:
    a machine-readable storage medium containing at least a dynamic validating editor, wherein the dynamic validating editor includes instructions for:
    receiving at least one indication of at least one user edit to a portion of a document;
    representing the portion of the document as a node within a hierarchical representation of the document;
    determining a type of the node;
    determining whether a customized editor is available for the portion of the document; and
    when the customized editor is available, populating at least part of the customized editor dynamically based, at least in part, on (i) the type of the node, (ii) imported classes from a schema, and (iii) at least one restriction that is specified by an enum in the schema and that is applicable to the node.

14. The system of claim 13, further comprising the document.

15. The system of claim 13, further comprising an XSD file that specifies the schema used to populate at least a portion of the customized editor dynamically based on the portion of the document, and a data type associated with the portion.

16. A workstation including the machine-readable storage medium of claim 13.

17. An enterprise management server including the machine-readable storage medium of claim 13.

18. The system of claim 13, wherein when the user edit is invalidated, the customized editor explains validity, and recommends corrective action.

19. The system of claim 13, wherein the instructions for populating the customized editor further include instructions for implementing restrictions that are not specified by the schema or that are not expressible in the schema.

20. At least one machine-readable storage medium comprising machine-readable instructions that, when executed by the machine, cause the machine to perform a method comprising:
    receiving at least one indication of at least one user edit to a portion of an XML document;
    representing the portion of the XML document as a node within a hierarchical representation of the XML document, wherein the hierarchical representation of the document provides a model-based representation of a relationship between the node and at least one further node;
    determining a type of the node;
    determining whether a customized editor is available for the portion of the XML document; and
    when the customized editor is available, populating at least part of the customized editor dynamically based, at least in part, on (i) the type of the node, (ii) a location of the node within the hierarchical representation of the XML document, (iii) imported classes from a schema specified in an XSD file, and (iv) at least one restriction that is specified by an enum in the schema and that is applicable to the node;

presenting the customized editor to a user;

receiving a response from the user via the customized editor;

validating the user edit based at least in part on the portion of the document and the type of the node; and when the user edit is invalidated, the customized editor explains validity, and recommends corrective action.

* * * * *